United States Patent
Braghiroli

(10) Patent No.: US 7,065,444 B2
(45) Date of Patent: Jun. 20, 2006

(54) METHOD OF MATCHING A VEHICLE WHEEL

(75) Inventor: Francesco Braghiroli, Reggio Emilia (IT)

(73) Assignee: Snap-on Equipment SRL a Unico Socio, Correggio (IT)

( * ) Notice: Subject to any disclaimer, the term of this patent is extended or adjusted under 35 U.S.C. 154(b) by 245 days.

(21) Appl. No.: 10/765,206

(22) Filed: Jan. 28, 2004

(65) Prior Publication Data

US 2005/0055153 A1 Mar. 10, 2005

(30) Foreign Application Priority Data

Sep. 4, 2003 (EP) .................................. 03020102

(51) Int. Cl.
*G06F 19/00* (2006.01)

(52) U.S. Cl. ........................... 701/124; 73/462; 73/468

(58) Field of Classification Search ................. 701/1, 701/29, 124; 702/94, 95; 73/146, 468, 459–462
See application file for complete search history.

(56) References Cited

U.S. PATENT DOCUMENTS

| | | | |
|---|---|---|---|
| 4,366,707 A * | 1/1983 | Jarschel | ....................... 73/146 |
| 4,817,429 A | 4/1989 | Goebel | |
| 5,103,595 A | 4/1992 | Dale et al. | |
| 5,506,683 A | 4/1996 | Yang et al. | |
| 6,069,966 A | 5/2000 | Jones et al. | |
| 6,336,364 B1 * | 1/2002 | Parker et al. | .................. 73/462 |
| 6,393,911 B1 | 5/2002 | Colarelli, III et al. | |
| 6,397,675 B1 * | 6/2002 | Colarelli et al. | .............. 73/462 |
| 6,484,574 B1 * | 11/2002 | Douglas et al. | ................ 73/462 |
| 6,523,408 B1 | 2/2003 | Colarelli, III et al. | |
| 6,535,281 B1 | 3/2003 | Conheady et al. | |
| 6,595,053 B1 | 7/2003 | Parker | |
| 2003/0187556 A1 | 10/2003 | Suzuki | |

* cited by examiner

*Primary Examiner*—Gary Chin
(74) *Attorney, Agent, or Firm*—McDermott Will & Emery LLP

(57) ABSTRACT

A method for determining an optimized position between the tire and rim of a wheel to improve operation smoothness of the wheel. Measurements are conducted to determine respective effects of wheel imbalance and non-uniformities contributed by the tire and rim at different rotational positions. An index vector representing the respective effects is defined. The optimized position is determined based on an observation of changes of the index vector relative to the changes of respective effects of wheel imbalance and non-uniformities contributed by the tire and rim at different rotational positions. The relative position between the tire and rim is adjusted according to the optimized position to achieve better operation of the wheel.

21 Claims, 3 Drawing Sheets

METHOD OF MATCHING A VEHICLE WHEEL

RELATED APPLICATIONS

This application is related to a co-pending patent application Ser. No. 10/765,207, titled "METHOD AND APPARATUS FOR OPTICALLY SCANNING A PNEUMATIC TIRE OF A VEHICLE WHEEL," filed concurrently herewith; a co-pending patent application Ser. No. 10/765,275, entitled "METHOD AND APPARATUS FOR BALANCING A MOTOR VEHICLE WHEEL," filed concurrently herewith; and a co-pending patent application Ser. No. 10/765,274, entitled "METHOD AND APPARATUS FOR OPTICALLY SCANNING A VEHICLE WHEEL," filed concurrently herewith. All of the applications are commonly assigned to the assignee of this application, and are incorporated herein by reference in their entireties.

FIELD OF THE DISCLOSURE

The present disclosure relates to a method of matching a vehicle wheel, and more specifically, to a novel wheel matching procedure that addresses effects caused by both geometrical non-uniformities and imbalance of a vehicle wheel.

BACKGROUND OF THE DISCLOSURE

In this disclosure, the term 'tire' denotes a pneumatic tire that is air-tight and mounted in the rim bed of the rim. When used, or during a measuring operation, the tire is filled with air at prescribed operating pressure provided by tire or vehicle manufacturers.

The term 'rim' refers to the part of a wheel that is made of metal, in particular aluminium, steel, or other alloy, and to which a pneumatic tire, usually made of rubber, is attached. The rim includes a peripherally extending rim bed to which the tire is attached, and a wheel disc portion within the peripherally extending rim bed. That wheel disc portion may have apertures or no aperture at all. The wheel disc may also be formed from spokes.

Geometrical non-uniformities in the tire and rim, such as uneven weight distribution or construction, usually cause problems in operation of vehicle wheels. Known methods for determining and minimizing the effects of non-uniformities (called matching) involve steps for ascertaining a highest point of the runout of the tire, and a lowest point of the runout of the rim, or vice-versa. The effects of non-uniformities of vehicle wheels can be minimized by rotating the tire relative to the rim to a carefully selected position, such that the resulting effects caused by the non-uniformities of the tire and the wheel are offset. For example, non-uniformities of a vehicle wheel may be minimized or cancelled out by rotating the tire relative to the rim to a selected position such that the highest point of the runout of the tire coincides with a position at which the lowest point the rim runout rests.

It is noted that the rotation smoothness of a vehicle wheel, in particular a motor vehicle wheel, is affected not only by forces caused by geometrical non-uniformities of the wheel, but also by centrifugal forces resulting from wheel imbalance. It is known to compensate such imbalance effects using a mass equalization procedure by, for example, attaching balancing weights to the wheel. However, such compensation process only addresses the effects coming from the centrifugal forces, and does not address the effects caused by the geometrical non-uniformities of the vehicle wheel.

Therefore, there is a need to provide an integrated method for matching vehicle wheels to improve the operation smoothness of vehicle wheels. There is another need for a convenient procedure that addresses both the effects caused by the geometrical non-uniformities and the imbalance of the vehicle wheel.

SUMMARY OF THE DISCLOSURE

This disclosure presents novel methods for matching a vehicle wheel. One advantage of the methods is on improved smoothness of the operation of vehicle wheels. Another advantage is in a novel, integrated process to match vehicle wheels that addresses effects caused by both geometrical non-uniformities and imbalance of the vehicle wheel. The vehicle wheel includes a tire mounted on a rim. The relative position between the tire and the rim is adjustable. According to an exemplary process of this disclosure, an index vector of the vehicle wheel including effects caused by wheel imbalance and geometrical non-uniformities is defined. The index vector varies with the relative position between the tire and the rim. Calculations are conducted to determine an optimized position between the tire and the rim that optimizes the index vector. The relative position between the tire and rim is adjusted accordingly to achieve better operation of the wheel.

According to one embodiment, the index vector is defined as the sum of deviations of geometrical parameters of the tire and the rim from reference values, and the amount of imbalance of the tire and the rim. The wheel matching process includes a measurement process, such as a runout measurement, to determine the amount of geometrical non-uniformities of the tire and the rim. In addition, an imbalance measuring operation to determine the imbalance status of the tire and the rim is also carried out. The measurements may be conducted separately or integrated into the same process. Calculations are then conducted to determine an optimized position between the tire and the rim that minimizes the index vector. The relative position between the tire and rim is adjusted accordingly to achieve better operation of the wheel.

According to another embodiment, in order to determine the optimized position, data related to deviations of geometrical parameters and imbalance status of the wheel may be imported from other data sources or previous measurements conducted by other systems. For example, the measurements may be conducted at a remote site, and the measurements result is then transferred to another system using data transmission networks, such as the internet, for further processing.

In still another embodiment, the tire is set up in a first position on the rim, and then rotated to a second position on the rim. The second position is chosen such that an index vector representing the effects of wheel imbalance and non-uniformities is minimized.

Additional aspects and advantages of the present disclosure will become readily apparent to those skilled in this art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF THE DISCLOSURE

Figure 1:
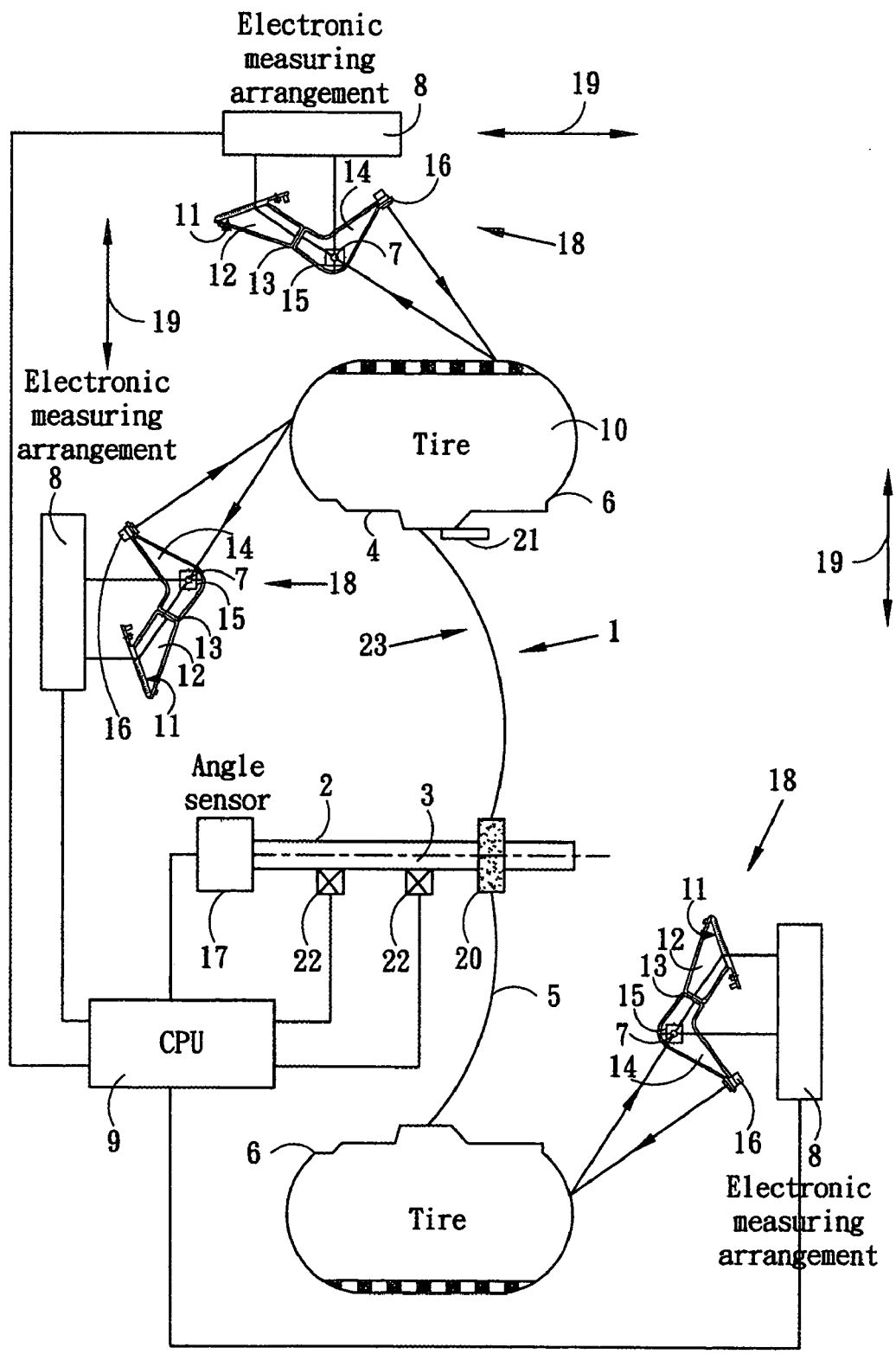
FIG. 1 is an exemplary system upon which an exemplary wheel matching process of this disclosure may be implemented.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

For illustration purpose, the following example describes an exemplary procedure for matching a wheel, which addresses the effects from both the geometrical non-uniformities and the imbalance of the vehicle wheel. In the exemplary procedure, a measuring process, such as runout measurement, is performed to obtain geometrical parameters of the wheel and the rim, and determine their respective deviations from specification values. An imbalance measuring operation is also performed to determine the imbalance status of the tire and the rim. According to one embodiment, the measuring operations are carried out at the same time. The wheel is caused to rotate during the imbalance measuring operation, and the geometrical deviation data of the tire and rim, and the deviations thereof are ascertained during the rotation of the wheel. According to another embodiment, the operations for measuring the geometrical deviation data and the imbalance are performed successively or separately.

The forces resulting from the imbalance of the tire and the imbalance of the rim can be measured separately, or measured in combination as the wheel balance. The geometrical deviation data includes, but not limited to, radial and/or lateral runouts of the tire and the rim. Those geometrical deviation data are ascertained by using, for example, a non-contact manner during the imbalance measuring operation. This operation can be conducted by using ultrasonic waves, capacitive sensors, optical scanners, optical triangulation method, or any combination thereof. Other non-contact methods and apparatus known to people in the field can also be used. Examples of non-contact measuring method and apparatus are described in U.S. Pat. No. 6,535,281, issued on Mar. 18, 2003, and titled "Method and apparatus for optically scanning a vehicle wheel," the content of which is incorporated herein by reference in its entirety.

After the geometrical deviation data and the imbalance status of the tire are obtained, the tire is rotated relative to the rim to a selected rotary angle position. The selected rotary angle position is chosen such that an index vector is optimized. According to one embodiment, the index vector F is defined as:

$$F = a_1 \cdot S_t + a_2 \cdot S_r + a_3 \cdot U_t + a_4 \cdot U_r \quad (1)$$

wherein:

$S_t$ is a force component resulting from the runout of the tire;

$S_r$ is a force component resulting from the runout of the rim;

$U_t$ is a force component resulting from the imbalance of the tire; and $U_r$ is a force component resulting from the imbalance of the rim.

The selected rotary angle position is chosen such that the index vector F is minimized. Each summand of the index vector F includes a direction, in particular a rotary angle position about the axis of rotation of the vehicle wheel. The index vector F changes with the rotary angle positions of the summands. In one embodiment, numerical methods, such as Brent's method, bisection, constrained optimization, etc, are used to determine an optimized rotary angle position that would minimize the index vector F. A data processing system, such as a computer, may be used to conduct the data processing and calculation. As a result of the calculation, an optimized rotational angle (matching angle) through which the tire is to be rotated with respect to the rim is determined. The relative position between the tire and the rim is adjusted accordingly to enhance operation smoothness of the wheel.

The index factor F may be defined to include weighting factors to each summand, such as a1, a2, a3 and a4 in equation (1), to alter the weight, or address the importance, of one force component over another. The weighting factors may be selected according to the type of wheels. For example, if a wheel is of the type that the rim has none or minimal tolerance of non-uniform mass distribution about the axis of the wheel, and geometrical deviations, the weighting factors associated with the rim is kept low in relation to the weighting factors of the tire.

In deciding the weighting factors, the weight of the rim (steel rim or light metal rim) and the weight of the tire may be considered. In addition, the weighting factors can be determined according to the running characteristics of the wheel defined by the vehicle manufacturer or the user of the vehicle. It is also possible to take account of the nature of the suspension system of the vehicle to which the wheel is mounted. In general, the weighting factors of the individual summands in the index vector are established empirically for respective types of wheels and respective groups of wheel types. Other definitions of the index vector that represent the effects of wheel imbalance and geometrical non-uniformities can also be used to determine an optimized position of the tire and rim that reduces such effects.

FIG. 1 is an exemplary system that can be used to determine the force components caused by the wheel imbalance and geometrical non-uniformities. As shown in FIG. 1, vehicle wheel 1 has a wheel disc portion 5 and a rim bed 4 fixed to the periphery of the wheel disc portion 5. A pneumatic tire 10 is mounted on the rim bed 4. Tire beads are supported in known manner at rim flanges 6 of the rim bed 4. The rim bed 4 and the wheel disc portion 5 form a rim 23.

The vehicle wheel 1 is fixed in known manner to a measuring shaft 2 of a wheel balancing machine (not shown in greater detail) at a fixing location 20, and is rotatably supported about an axis of rotation defined by the measuring shaft 2. When the wheel is clamped in a centered position, the shaft 2 coincides with wheel axis 3, which ensures that wheel axis 3 is stationary. Force transducers 22 are provided for measuring forces caused by imbalance of the vehicle wheel 1 or its components, as the tire 10 or the rim 23 are connected with the measuring shaft 2.

The dimensions and positions of constituent parts of the pneumatic tire 10 can be measured with one or more sensor devices 18, and ascertained using a computer. Each sensor device includes a light source 16, such as laser, and a receiver 12, such as a CCD-sensor, as a position-sensitive receiving element. The light source 16 and the receiver 12 are fixed to a carrier 14. The carrier 14 is supported pivotably about a pivot axis 7. The carrier 14 can also be movably mounted linearly (arrow 19) or on a predetermined guide path with respect to the measuring shaft 2 and the fixing 20 of the vehicle wheel 1 to the measuring shaft 2. The pivotal movement and the optionally additional linear or guided movement can be implemented by means of a drive (not shown), such as one or more stepping motors. A receiver optical system 13 is also provided on the carrier 14. The receiver optical system 13 and the CCD-sensor 11 are constituent parts of the receiver 12.

The light source 16 emits a light beam on to the surface of the pneumatic tire 10 and forms a light spot on the surface. The light is then reflected passing through the focusing receiver optical system 13 on to the sensor elements of the CCD-sensor 11. The CCD-sensor 11 can detect a plurality of local maxima of an illumination intensity function, independently of each other. The direction of the reflected beam depends on the distance of the location scanned on the pneumatic tire 10, with respect to the light source 16 and with respect to the receiver. Based on the distance, the reflected beam is directed by the receiver optical system 13 on to a given location of the CCD-sensor 11 and then converted into a position-sensitive or position-dependent signal. That signal is passed to an electronic measuring arrangement 8, which is further connected to a position sensor 15. The position sensor 15 supplies the electronic measuring arrangement 8 with position signals that are representing to the respective positions of the light source 16 and the CCD-sensor 11. The light source 16 and the receiver 12 are capable of moving together with each other as they are fixed to the common carrier 14. The position signals are related to a reference position present on the machine (the machine is not shown), and are thus related to the measuring shaft 2 mounted stationarily at the machine and the axial fixing location 20 at which the vehicle wheel 1 is fixed to the measuring shaft 2. The electronic measuring arrangement 8 produces measurement signals that correspond to the positions of the surface locations (spots) of the pneumatic tire 10, which are scanned by the light beams emitted by the light source 16.

All surface locations of the pneumatic tire 10 can be detected by sensor devices 18 which are associated with the inside surface (left-hand sensor device 18 in the FIG. 1), the outside surface (right-hand sensor device 18 in the FIG. 1), and the tread surface (upwardly disposed sensor device 18 in the FIG. 1) of the pneumatic tire 10. It is also possible to use only one sensor device 18 that moves to suitable measuring positions on a predetermined guide path to the inside, the outside, and also the tread surface of the pneumatic tire 10.

In order to detect all surface spots of the vehicle wheel 1, the wheel can be mounted rotatably about the wheel axle 3 with the measuring shaft 2. The electronic measuring arrangement 8 that provides the corresponding measurement signals can be a constituent part of the respective sensor device 18. It is also possible for the electronic measuring arrangement 8 to be integrated into an evaluation device 9, which operates in computer-aided fashion. By virtue of the described measuring arrangement, dimensions and positions of constituent parts of the pneumatic tire 10 as well as properties of those constituent parts can be determined and evaluated by the evaluation device 9 in a computer-aided procedure.

The respective rotary angle position of the pneumatic tire 10 can be determined by a rotary angle sensor 17, which is connected to the measuring shaft 2 of the wheel balancing machine in conventional manner. The sensor 17 supplies rotary angle increments to the evaluation device 9, such as a computer, indicating the rotary movement of the motor vehicle wheel 1. The data sensed by the rotary angle sensor 17 includes information related to the respective rotary angle positions of the surface location of the tire surface, which is being scanned by the respective sensor device 18. A tire inflation valve 21 can serve as a scan reference when the sensor device 18 scans the vehicle wheel 1 to determine the rotary angle location of the vehicle wheel 1.

The sensor device 18 associated with the inside surface of the vehicle wheel can be mounted to the housing of the wheel balancing machine, preferably beneath the measuring shaft 2. The sensor device associated with scanning of the tread surface of the pneumatic tire 10 can be disposed in the proximity of a pivot axis of a wheel guard hood that, in the measuring run, is pivoted into position over the rotating wheel in known manner. The sensor device 18 associated with the outside of the vehicle wheel 1 can be arranged on the pivotable wheel guard hood or connected thereto.

As can be seen from the figure, the side walls of the wheel and the tread surface of the pneumatic tire 10 can be scanned with the three sensor devices. The region of the tire shoulders can also be detected by the measuring arrangement illustrated in FIG. 1. As already explained above, it is possible to detect rotary angle-related geometrical deviations (runouts) of the tire 10 and of the rim 4. The angular positions of the deviations are measured by the rotary angle sender 17.

The forces resulting from the imbalance of the tire and the imbalance of the rim can be measured using the system as shown in FIG. 1. The forces may be measured separately or in combination as the wheel balance. The geometrical deviation of the wheel is ascertained during the imbalance measuring operation. Examples of non-contact measuring method and apparatus are described in U.S. Pat. No. 6,535,281, issued on Mar. 18, 2003, and titled "Method and apparatus for optically scanning a vehicle wheel," the content of which is incorporated herein by reference in its entirety.

The force components resulting from the runout of the tire and the rim vary with the respective weight of the tire and the rim. The force components contributed by the imbalance of the tire and the imbalance of the rim can be measured in conventional manner in the form of centrifugal forces on a wheel balancing machine. The force components can be determined separately by suitable measurement procedures. For instance, for measuring tire imbalance, the tire is mounted on a balanced rim installed on a wheel balancer. On the other hand, for measuring the imbalance of a rim, the rim can be measured on balancer without having a tire attached on the rim. The two forces resulting from the imbalance of the tire and the imbalance of the rim in combination are measured as the wheel balance.

Figure 2:
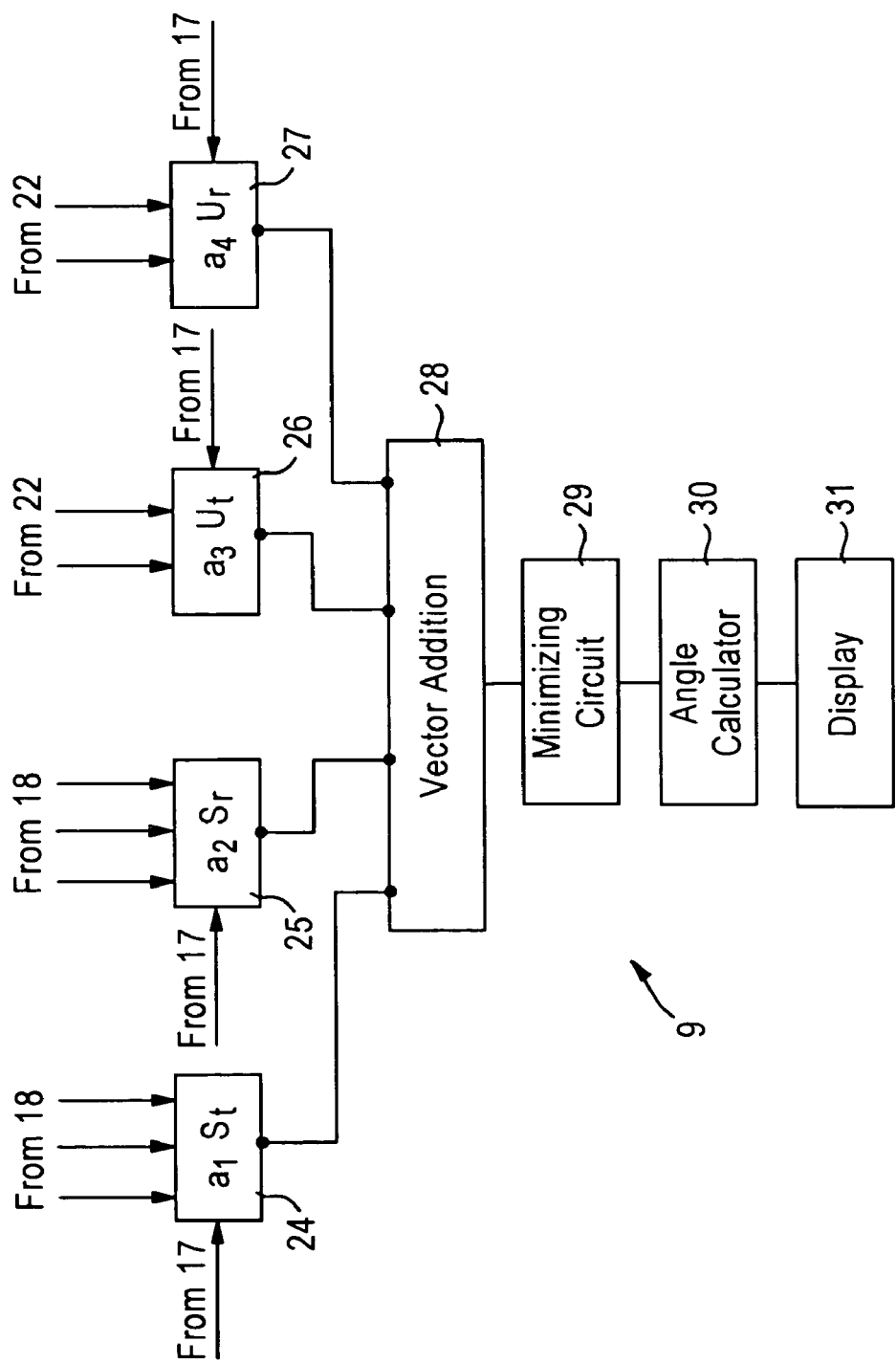
FIG. 2 depicts a block diagram illustrating the operation of system shown in FIG. 1.

FIG. 2 illustrates the operation of an exemplary wheel matching method implemented with the system shown in FIG. 1. The values of the geometrical deviations, particularly radial and/or lateral runouts of the tire 10 and the rim 23, and related angular positions are transmitted to associated vector generators 24 and 25 (FIG. 2). The vector generator 24 forms a force vector resulting from the runout, the related angular position and a first weighting factor of tire 10. The vector generator 25 forms a force vector resulting from the runout, the related angular position and a first weighting factor of the rim 23. The vector generator 26 forms a force vector based on the imbalance of tire 10, the related angular position, and a second weighting factor for the tire 10. The vector generator 27 generates a force vector resulting from the imbalance of the rim 23, the related angular position, and a second weighting factor for the rim 23. The respective weighting factors may be stored in system memory (not shown) or accessed from a remote system using a data transmission network, such as the internet. The force vectors are fed to a vector adder 28 connected to the vector generators, to generate an index vector F in equation (1).

The individual force vectors of the index vector F include directions, in particular rotary angle positions about the axis of rotation of the vehicle wheel. By altering the rotary angle positions of the individual force vectors of the relative to each other, it is possible to minimize the index vector in an minimizing circuit 29 by means of numerical methods, such as Brent's method, bisection, constrained optimization etc. The calculation provides an optimized rotational angle (matching angle) through which the tire 10 is to be rotated with respect to the rim 23 into the second position. The calculation of the rotational angle is performed in an angle calculator 30, such as a computer. A display 31 is coupled to the angle calculator 30 and shows the matching angle.

Figure 3:
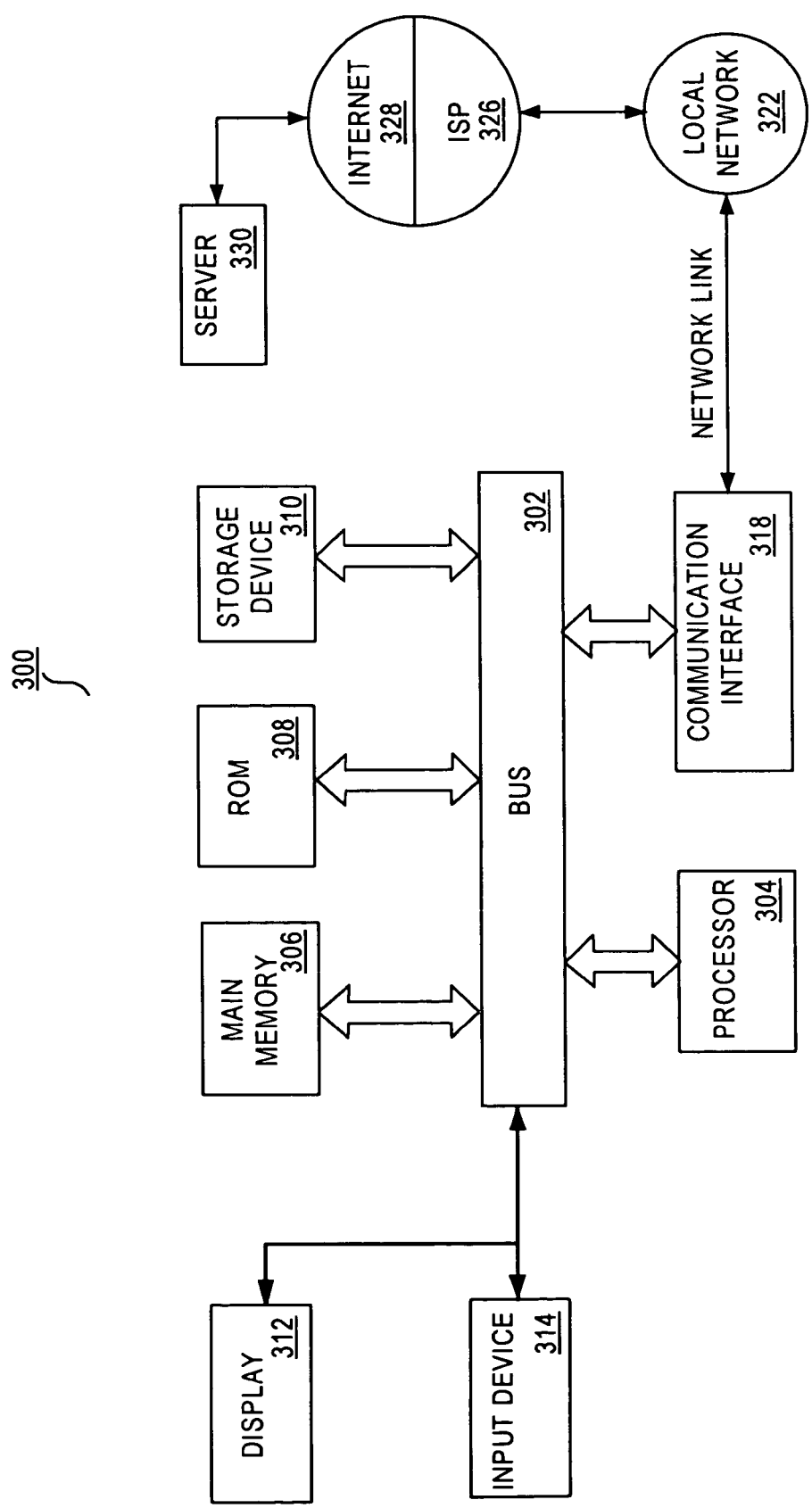
FIG. 3 shows a computer system upon used to determine the optimized position of the tire and the rim.

The process as described in FIG. 2 may be implemented as software for controlling a data processing system, such as a computer, to perform the described steps and functions. FIG. 3 shows a computer system upon which the calculation process as described above may be implemented. Computer system 300 includes a bus 302 for communicating information, and a processor 304 operatively coupled with bus 302 for processing information. Computer system 300 also includes a main memory 306, such as a random access memory (RAM) or other dynamic storage device, operatively coupled to bus 302 for storing information and instructions to be executed by processor 304. A read only memory (ROM) 308 or other static storage device is operatively coupled to bus 302 for storing static information and instructions for processor 304. A storage device 310, such as a magnetic disk or optical disk, is provided and operatively coupled to bus 302 for storing information and instructions.

Computer system 300 may be operatively coupled via bus 302 to a display 312, such as a cathode ray tube (CRT), for displaying information to a computer user. An input device 314, including alphanumeric and other keys, may be operatively coupled to bus 302 for communicating information and command selections to processor 304. Other types of user input devices include cursor control, such as a mouse, a trackball, or cursor direction keys for communicating direction information and command selections to processor 304 and for controlling cursor movement on display 312.

Computer system 300 has a communication interface 318 operatively coupled to bus 302. Communication interface 318 provides a two-way data communication operatively coupled to a network link 320 that is connected to a local network 322. Wireless links may also be implemented.

Network link 320 typically provides data communication through one or more networks to other data devices. For example, network link 320 may provide a connection through local network 322 to a host computer or to data equipment operated by an Internet Service Provider (ISP) 326. ISP 326 in turn provides data communication services through the worldwide packet data communication network, such as the internet 328, which in turn couples to a server 330.

After completion of the wheel matching process described above, i.e., after rotating the tire to the selected rotary angle position on the rim, an optional balance measuring operation may be carried out to determine whether the residual imbalance of the wheel is within specification. If not, imbalance compensation may be made on the wheel in known manner, such as by adding balancing weights. The imbalance measuring operations may involve static or dynamic imbalance measuring operations, in which appropriate imbalance compensation can be effected statically or dynamically depending on the respective type of wheel.

In order to improve operation smoothness of vehicle wheels, the geometrical deviations and imbalance of a set of tires and rims of a motor vehicle are measured, and the four tires and rims of the set are assembled such that the above explained vector sum for each vehicle wheel is minimized.

Embodiments discussed above apply to different types of vehicles, such as automobile, motorcycles, airplanes, etc. The disclosure has been described with reference to specific embodiments thereof. It will, however, be evident that various modifications and changes may be made thereto without departing from the broader spirit and scope of the disclosure. The concepts described in the disclosure can apply to various operations without departing from the concepts. The specification and drawings are, accordingly, to be regarded in an illustrative rather than a restrictive sense.

What is claimed is:

1. A method for matching a wheel having a tire mounted on a rim, the method including the steps of:
   receiving data representing effects caused by geometrical non-uniformities of the rim and the tire, wherein the effects caused by geometrical non-uniformities of the rim and the tire vary with positional parameters of the tire and the rim;
   receiving data representing effects caused by imbalance of the rim and the tire, wherein the effects caused by imbalance of the rim and the tire vary with positional parameters of the tire and the rim;
   defining an index vector representing the effects caused by geometrical non-uniformities of the rim and the tire, and the effects caused by imbalance status of the rim and the tire; and
   determining an optimized position of the tire and the rim based on the index vector.

2. The method of claim 1, wherein the effects caused by geometrical non-uniformities of the rim and the tire, and the effects caused by imbalance of the rim and the tire are measured at the same time.

3. The method according of claim 2, wherein the effects caused by geometrical non-uniformities of the rim and the tire are measured by non-contacting means during determination of the effects caused by imbalance of the rim and the tire.

4. The method according to claim 1, wherein the effects caused by geometrical non-uniformities of the rim and the tire, and the effects caused by imbalance of the rim and the tire are measured in succession.

5. The method according to claim 1, wherein each summand of the index vector represents the effects caused by geometrical non-uniformities of the rim, the effects caused by geometrical non-uniformities of the tire, and the effects caused by imbalance of the rim, and the effects caused by imbalance of the tire.

6. The method according to claim 5, wherein each summand of the index vector is associated with a weighting vector.

7. The method according to claim 6, wherein the weighting factor is set based on the type of the wheel.

8. The method according claim 1, further comprising the steps of:
  positioning the tire and the rim based on the optimized position;
  subsequently determining an imbalance status of the wheel; and
  responsive to a result of the determination step, selectively conducting an imbalance compensation process.

9. A machine-readable medium bearing instructions for determining an optimized relative position of a tire and rim of a wheel, the instructions upon execution by a data processing system causing the data processing system to perform the steps of:
  receiving data representing effects caused by geometrical non-uniformities of the rim and the tire, wherein the effects caused by geometrical non-uniformities of the rim and the tire vary with positional parameters of the tire and the rim;
  receiving data representing effects caused by imbalance of the rim and the tire, wherein the effects caused by imbalance of the rim and the tire vary with positional parameters of the tire and the rim;
  defining an index vector representing the effects caused by geometrical non-uniformities of the rim and the tire, and the effects caused by imbalance status of the rim and the tire; and
  determining an optimized position of the tire and the rim based on the index vector.

10. The medium of claim 9, wherein the effects caused by geometrical non-uniformities of the rim and the tire, and the effects caused by imbalance of the rim and the tire are measured at the same time.

11. The medium according of claim 10, wherein the effects caused by geometrical non-uniformities of the rim and the tire are measured by non-contacting means during determination of the effects caused by imbalance of the rim and the tire.

12. The medium according to claim 9, wherein each summand of the index vector represents the effects caused by geometrical non-uniformities of the rim, the effects caused by geometrical non-uniformities of the tire, and the effects caused by imbalance of the rim, and the effects caused by imbalance of the tire.

13. The medium according to claim 12, wherein each summand of the index vector is associated with a weighting vector.

14. The medium according to claim 13, wherein the weighting factor is set based on the type of the wheel.

15. A system for determining an optimized relative position of a tire and rim of a wheel, the system comprising:

non-contacting sensing means for determining effects caused by geometrical non-uniformities of the rim and the tire, wherein the effects caused by geometrical non-uniformities of the rim and the tire vary with positional parameters of the tire and the rim;
  detecting means for detecting effects caused by imbalance of the rim and the tire, wherein the effects caused by imbalance of the rim and the tire vary with positional parameters of the tire and the rim; and
  a data processing system coupled to the non-contacting sensing means and the detecting means for receiving data representing the effects caused by geometrical non-uniformities of the rim and the tire, and data representing the effects caused by imbalance of the rim and the tire;
  wherein the data processing system is configured to perform the steps of:
  calculating an index vector based on the data representing the effects caused by geometrical non-uniformities of the rim and the tire, and data representing the effects caused by imbalance of the rim and the tire; and
  determining an optimized position of the tire and the rim based on the index vector.

16. The system of claim 15, wherein the non-contacting sensing means and the detecting means determine the effects caused by geometrical non-uniformities of the rim and the tire, and the effects caused by imbalance of the rim and the tire are measured at the same time.

17. The system according to claim 15, wherein each summand of the index vector represents the effects caused by geometrical non-uniformities of the rim, the effects caused by geometrical non-uniformities of the tire, and the effects caused by imbalance of the rim, and the effects caused by imbalance of the tire.

18. The system according to claim 17, wherein each summand of the index vector is associated with a weighting vector.

19. The system according to claim 18, wherein the weighting factor is set based on the type of the wheel.

20. The system according to claim 17, wherein the data processing system calculates the index vector by accessing the respective weighting vector stored in non-volatile memory of the data processing system.

21. A method of matching a vehicle wheel having a pneumatic tire mounted on a rim, in which the tire and the rim are rotatable relative to each other, the method characterised in that geometrical deviation data representing deviations from geometrical reference data of the tire and the rim are measured, and an imbalance measuring operation is carried out, wherein during the operation of measuring the geometrical deviation data and the imbalance measuring operation, the tire is in a first position on the rim, and that the tire is then rotated on the rim to a second position such that an index vector resulting from the geometrical deviation data of the tire and the rim, and the imbalance caused by the tire and the rim, is minimized.

* * * * *